US012654593B2

(12) United States Patent
Taniguchi et al.

(10) Patent No.: US 12,654,593 B2
(45) Date of Patent: Jun. 16, 2026

(54) TRAVEL CONTROL DEVICE FOR FUEL CELL VEHICLE

(71) Applicants: Hino Motors, Ltd., Tokyo (JP);
TOYOTA JIDOSHA KABUSHIKI KAISHA, Toyota (JP)

(72) Inventors: Koichiro Taniguchi, Hino (JP);
Minoru Kowada, Hino (JP); Jun Namima, Hino (JP)

(73) Assignees: Hino Motors, Ltd., Tokyo (JP);
TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 18/408,827

(22) Filed: Jan. 10, 2024

(65) Prior Publication Data

US 2024/0227626 A1    Jul. 11, 2024

(30) Foreign Application Priority Data

Jan. 11, 2023    (JP) ................................. 2023-002365

(51) Int. Cl.
| | |
|---|---|
| *B60L 58/40* | (2019.01) |
| *B60L 15/20* | (2006.01) |
| *B60L 50/75* | (2019.01) |
| *B60L 58/12* | (2019.01) |

(52) U.S. Cl.
CPC .............. *B60L 58/40* (2019.02); *B60L 15/20* (2013.01); *B60L 50/75* (2019.02); *B60L 58/12* (2019.02); *B60L 2240/12* (2013.01); *B60L 2250/28* (2013.01); *B60L 2260/26* (2013.01)

(58) Field of Classification Search
CPC .......... B60L 58/40; B60L 15/20; B60L 50/75; B60L 58/12; B60L 2240/12; B60L 2250/28; B60L 2260/26; Y02E 60/50; Y02T 90/40
See application file for complete search history.

(56) References Cited

U.S. PATENT DOCUMENTS

| | | | | |
|---|---|---|---|---|
| 2014/0180516 A1* | 6/2014 | Ueda | ....................... | B60K 6/52 |
| | | | | 180/65.265 |
| 2017/0179512 A1* | 6/2017 | Eschenbach | ...... | H01M 8/04992 |
| 2021/0111422 A1* | 4/2021 | Park | ................. | H01M 8/04955 |

FOREIGN PATENT DOCUMENTS

| | | |
|---|---|---|
| JP | 6075560 B2 | 2/2017 |
| JP | 2019-12612 A | 1/2019 |

* cited by examiner

*Primary Examiner* — Alan D Hutchinson
(74) *Attorney, Agent, or Firm* — Oblon, McClelland, Maier & Neustadt, L.L.P.

(57) ABSTRACT

A travel control device includes: a switching determination unit configured to determine whether a traveling mode of the fuel cell vehicle is switched from a first traveling mode in which the fuel cell vehicle travels mainly using power generated by a fuel cell to a second traveling mode in which the fuel cell vehicle travels using discharge power of a battery; and a permission determination unit configured to determine whether to permit traveling in the second traveling mode based on a charging rate of the battery when the switching determination unit determines that the traveling mode has been switched from the first traveling mode to the second traveling mode, in which the permission determination unit is configured to permit traveling in the second traveling mode when the charging rate of the battery is greater than or equal to a predetermined charging rate threshold for permission.

12 Claims, 5 Drawing Sheets

*Fig.2*
1(5)

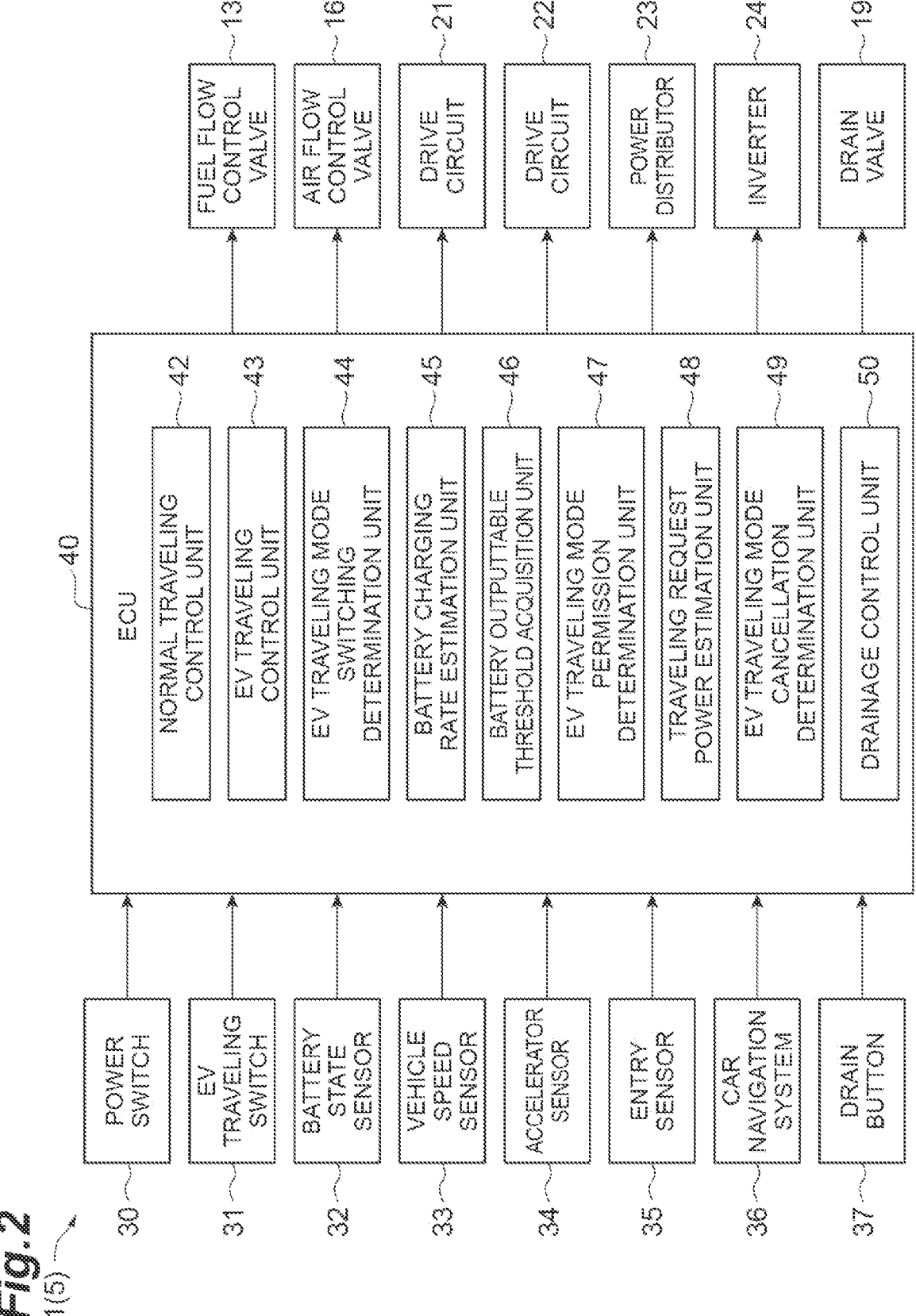

40 ECU

| 30 | POWER SWITCH | → | 42 | NORMAL TRAVELING CONTROL UNIT | → | FUEL FLOW CONTROL VALVE | 13 |
| 31 | EV TRAVELING SWITCH | → | 43 | EV TRAVELING CONTROL UNIT | → | AIR FLOW CONTROL VALVE | 16 |
| 32 | BATTERY STATE SENSOR | → | 44 | EV TRAVELING MODE SWITCHING DETERMINATION UNIT | → | DRIVE CIRCUIT | 21 |
| 33 | VEHICLE SPEED SENSOR | → | 45 | BATTERY CHARGING RATE ESTIMATION UNIT | → | DRIVE CIRCUIT | 22 |
| 34 | ACCELERATOR SENSOR | → | 46 | BATTERY OUTPUTTABLE THRESHOLD ACQUISITION UNIT | → | POWER DISTRIBUTOR | 23 |
| 35 | ENTRY SENSOR | → | 47 | EV TRAVELING MODE PERMISSION DETERMINATION UNIT | → | INVERTER | 24 |
| 36 | CAR NAVIGATION SYSTEM | → | 48 | TRAVELING REQUEST POWER ESTIMATION UNIT | → | DRAIN VALVE | 19 |
| 37 | DRAIN BUTTON | → | 49 | EV TRAVELING MODE CANCELLATION DETERMINATION UNIT | | | |
| | | | 50 | DRAINAGE CONTROL UNIT | | | |

*Fig.5*

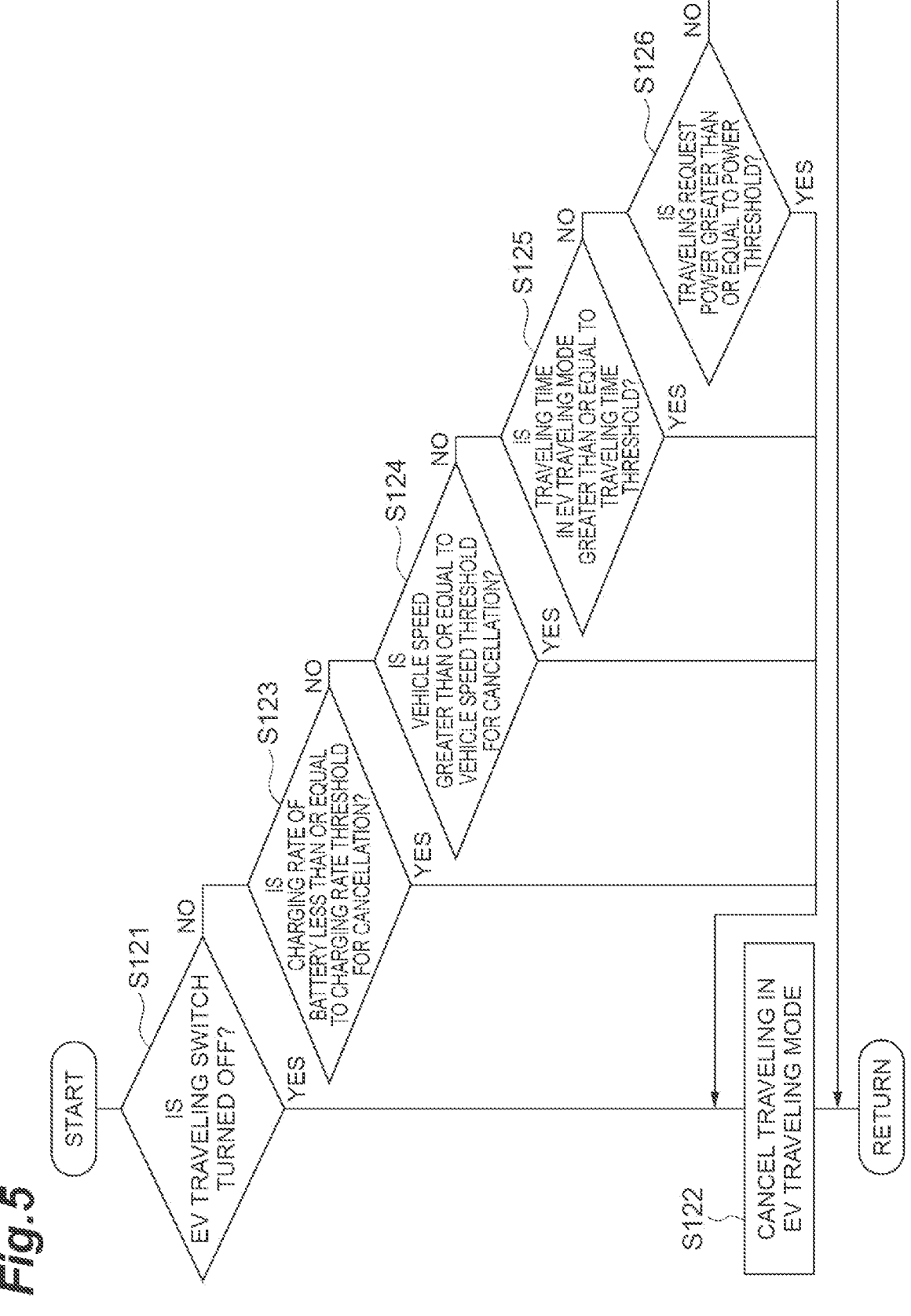

START

S121
IS
EV TRAVELING SWITCH
TURNED OFF?

NO

YES

S123
IS
CHARGING RATE OF
BATTERY LESS THAN OR EQUAL
TO CHARGING RATE THRESHOLD
FOR CANCELLATION?

NO

YES

S124
IS
VEHICLE SPEED
GREATER THAN OR EQUAL TO
VEHICLE SPEED THRESHOLD
FOR CANCELLATION?

NO

YES

S125
IS
TRAVELING TIME
IN EV TRAVELING MODE
GREATER THAN OR EQUAL TO
TRAVELING TIME
THRESHOLD?

NO

YES

S126
IS
TRAVELING REQUEST
POWER GREATER THAN
OR EQUAL TO POWER
THRESHOLD?

NO

YES

S122
CANCEL TRAVELING IN
EV TRAVELING MODE

RETURN

TRAVEL CONTROL DEVICE FOR FUEL CELL VEHICLE

TECHNICAL FIELD

The present disclosure relates to a travel control device for a fuel cell vehicle.

BACKGROUND

For example, Japanese Patent No. 6075560 describes a technique of determining whether or not a current position of a fuel cell vehicle is at a drainage suppression point set in advance on map data, and controlling a drainage control valve to suppress drainage from a water storage tank that stores water generated by power generation of a fuel cell when the current position of the fuel cell vehicle is at the drainage suppression point.

SUMMARY

By the way, for example, when the fuel cell vehicle travels in a large area where drainage is not allowed, such as inside a factory site, the time during which power generation by the fuel cell is continued becomes long, and thus the time during which water generation is continued by power generation by the fuel cell becomes long. Therefore, since water is stored in the fuel cell, it is necessary to discharge water from the fuel cell.

An object of the present disclosure is to provide a travel control device for a fuel cell vehicle capable of suppressing drainage from a fuel cell when the fuel cell vehicle travels in a place where drainage is not allowed.

(1) One aspect of the present disclosure is a travel control device for a fuel cell vehicle including a fuel cell and a battery, the travel control device including: a switching determination unit configured to determine whether a traveling mode of the fuel cell vehicle is switched from a first traveling mode in which the fuel cell vehicle travels mainly using power generated by the fuel cell to a second traveling mode in which the fuel cell vehicle travels using discharge power of the battery; a charging rate detection unit configured to detect a charging rate of the battery; and a permission determination unit configured to determine whether to permit traveling in the second traveling mode based on the charging rate of the battery detected by the charging rate detection unit when the switching determination unit determines that the traveling mode of the fuel cell vehicle has been switched from the first traveling mode to the second traveling mode, in which the permission determination unit is configured to permit traveling in the second traveling mode when the charging rate of the battery is greater than or equal to a predetermined charging rate threshold for permission.

In such a travel control device, it is determined whether the traveling mode of the fuel cell vehicle has been switched from the first traveling mode to the second traveling mode. The first traveling mode is a traveling mode in which the vehicle travels mainly using the power generated by the fuel cell. The second traveling mode is a traveling mode in which the power generation of the fuel cell is stopped and the vehicle travels using the discharge power of the battery. Then, when it is determined that the traveling mode of the fuel cell vehicle has been switched to the second traveling mode, it is determined whether to permit traveling in the second traveling mode based on the charging rate of the battery. Specifically, when the charging rate of the battery is greater than or equal to the charging rate threshold for permission, the traveling in the second traveling mode is permitted. Then, the fuel cell vehicle stops the power generation of the fuel cell and travels using only the discharge power of the battery. At this time, since the charging rate of the battery is greater than or equal to the charging rate threshold for permission, the stored power of the battery is suppressed from becoming insufficient. By stopping the power generation of the fuel cell as described above, water generated by the power generation of the fuel cell is suppressed from being stored in the fuel cell, and thus it is not necessary to discharge water from the fuel cell. This makes it possible to suppress drainage from the fuel cell when the fuel cell vehicle travels in a place where drainage is not allowed.

(2) In the above-described (1), the travel control device may further include a battery state detection unit configured to detect a state of the battery, and the permission determination unit may be configured to permit traveling in the second traveling mode when it is determined that the charging rate of the battery is greater than or equal to the charging rate threshold for permission and output power of the battery is greater than or equal to an outputtable threshold based on the state of the battery detected by the battery state detection unit. In such a configuration, even when the state of the battery fluctuates due to a change in environment or the like, drainage from the fuel cell can be appropriately suppressed when the fuel cell vehicle travels in a place where drainage is not allowed.

(3) In the above-described (1) or (2), the travel control device may include a vehicle speed detection unit configured to detect a vehicle speed of the fuel cell vehicle, and the permission determination unit may be configured to permit traveling in the second traveling mode when the charging rate of the battery is greater than or equal to the charging rate threshold for permission and the vehicle speed of the fuel cell vehicle detected by the vehicle speed detection unit is less than or equal to a predetermined vehicle speed threshold for permission. In such a configuration, when the fuel cell vehicle is traveling at a low speed (including a zero vehicle speed), traveling in the second traveling mode is permitted, so that power consumption of the battery can be suppressed.

(4) In any one of the above-described (1) to (3), the travel control device may further include a cancellation determination unit configured to determine whether to cancel traveling in the second traveling mode in a state where the traveling mode of the fuel cell vehicle is the second traveling mode. In such a configuration, when the traveling in the second traveling mode is canceled, the fuel cell vehicle travels in the first traveling mode. Therefore, the power consumption of the battery can be suppressed.

(5) In the above-described (4), the travel control device may further include a manual operation unit configured to perform an instruction operation of the second traveling mode, and the cancellation determination unit may be configured to cancel traveling in the second traveling mode when the manual operation unit is turned OFF. In such a configuration, when a driver of the fuel cell vehicle performs an OFF operation of the manual operation unit, the traveling in the second traveling mode is canceled by the will of the driver.

(6) In the above-described (4), the cancellation determination unit may be configured to cancel traveling in the second traveling mode when the charging rate of the battery is less than or equal to a predetermined charging rate threshold for cancellation. In such a configuration, when the charging rate of the battery decreases to the charging rate threshold for cancellation, the traveling in the second traveling mode is automatically cancelled. Therefore, since excessive use of energy of the battery is suppressed, it is possible to suppress hindrance to traveling after traveling in a place where drainage is not allowed is finished.

(7) In the above-described (4), the travel control device may further include a vehicle speed detection unit configured to detect a vehicle speed of the fuel cell vehicle, and the cancellation determination unit may be configured to cancel traveling in the second traveling mode when the vehicle speed of the fuel cell vehicle detected by the vehicle speed detection unit is greater than or equal to a predetermined vehicle speed threshold for cancellation. In such a configuration, when the vehicle speed of the fuel cell vehicle increases to the vehicle speed threshold for cancellation, the traveling in the second traveling mode is automatically canceled. Therefore, since excessive use of energy of the battery is suppressed, it is possible to suppress hindrance to traveling after traveling in a place where drainage is not allowed is finished.

(8) In the above-described (4), the travel control device may further include a traveling time detection unit configured to detect a traveling time of the fuel cell vehicle, and the cancellation determination unit may be configured to cancel traveling in the second traveling mode when the traveling time of the fuel cell vehicle detected by the traveling time detection unit is greater than or equal to a predetermined traveling time threshold. In such a configuration, when the traveling time of the fuel cell vehicle reaches the traveling time threshold, the traveling in the second traveling mode is automatically canceled. Therefore, since excessive use of energy of the battery is suppressed, it is possible to suppress hindrance to traveling after traveling in a place where drainage is not allowed is finished.

(9) In the above-described (4), the travel control device may further include an accelerator detection unit configured to detect an operation state of an accelerator of the fuel cell vehicle, and the cancellation determination unit may be configured to cancel traveling in the second traveling mode when it is determined that traveling request power of the fuel cell vehicle is greater than or equal to a predetermined power threshold based on the operation state of the accelerator detected by the accelerator detection unit. In such a configuration, when the traveling request power of the fuel cell vehicle becomes greater than or equal to the power threshold, the traveling in the second traveling mode is automatically canceled. Therefore, for example, when a large amount of traveling power is required as in traveling on an upslope or the like, the fuel cell vehicle travels in the first traveling mode, so that smooth traveling can be performed.

(10) In any one of the above-described (1) to (9), the travel control device may farther include a manual operation unit configured to perform an instruction operation of the second traveling mode, and the switching determination unit may be configured to determine that the traveling mode of the fuel cell vehicle has been switched from the first traveling mode to the second traveling mode when the manual operation unit is turned ON. In such a configuration, when the driver of the fuel cell vehicle performs an ON operation of the manual operation unit, the traveling mode of the fuel cell vehicle is switched to the second traveling mode by the will of the driver.

(11) In any one of the above-described (1) to (9), the travel control device may further include an entry detection unit configured to detect whether the fuel cell vehicle has entered a predetermined designated area, and the switching determination unit may be configured to determine that the traveling mode of the fuel cell vehicle has been switched from the first traveling mode to the second traveling mode when the entry detection unit detects that the fuel cell vehicle has entered the designated area. In such a configuration, when the fuel cell vehicle enters the designated area, the traveling mode of the fuel cell vehicle is automatically switched to the second traveling mode.

According to the present disclosure, it is possible to suppress drainage from a fuel cell when a fuel cell vehicle travels in a place where drainage is not allowed.

BRIEF DESCRIPTION OF THE DRAWINGS

FIG. 2 is a block diagram of a vehicle control device including the travel control device illustrated in FIG. 1;

FIG. 5 is a flowchart showing a procedure of a cancellation determination process executed by the EV traveling mode cancellation determination unit illustrated in FIG. 2.

DETAILED DESCRIPTION

Hereinafter, embodiments of the present disclosure will be described with reference to the drawings.

Figure 1:
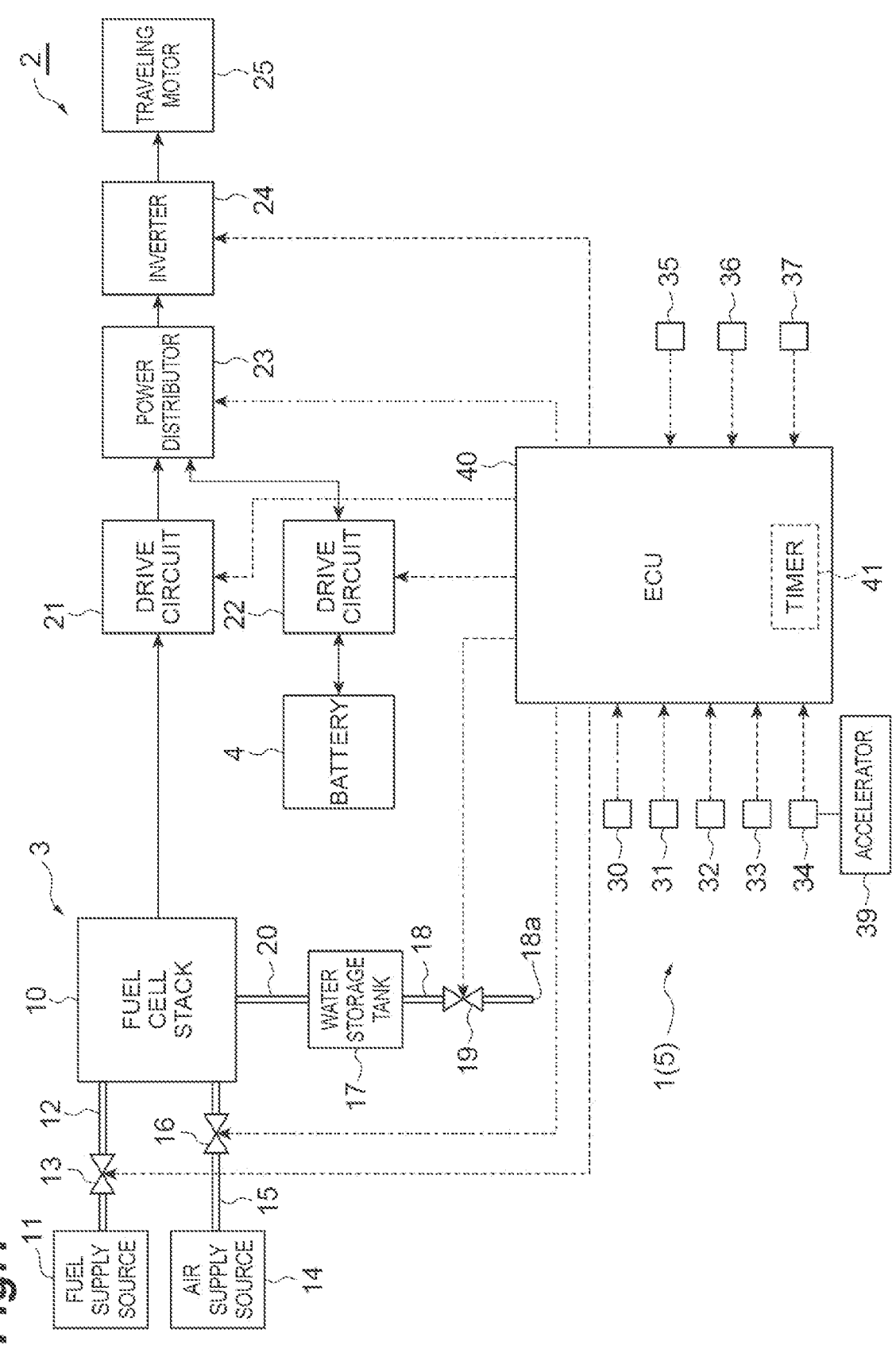
FIG. 1 is a schematic configuration diagram showing a main part of a fuel cell vehicle including a travel control device according to an embodiment of the present disclosure.

FIG. 1 is a schematic configuration diagram showing a main part of a fuel cell vehicle including a travel control device according to an embodiment of the present disclosure. In FIG. 1, a travel control device 1 of the present embodiment is a device that performs travel control of a fuel cell vehicle 2. The travel control device 1 is included in a vehicle control device 5. The vehicle control device 5 is mounted on the fuel cell vehicle 2. The fuel cell vehicle 2 is a large commercial vehicle such as a large truck.

The fuel cell vehicle 2 includes a fuel cell 3 that generates power and a battery 4 that can be charged and discharged. The fuel cell vehicle 2 is a power train that drives the fuel cell 3 and the battery 4 as a power source. The fuel cell vehicle 2 can travel by switching between a normal traveling mode and an EV traveling mode.

The normal traveling mode is a first traveling mode in which the vehicle travels mainly using power generated by the fuel cell 3. Specifically, the normal traveling mode is a traveling mode in which the vehicle travels using the power generated by the fuel cell 3 and discharge power of the battery 4. The generated power of the fuel cell 3 is power generated by the fuel cell 3. The discharge power of the battery 4 is power stored in the battery 4.

The EV traveling mode is a second traveling mode in which the vehicle travels using the discharge power of the battery 4. Specifically, the EV traveling mode is a traveling mode in which the vehicle travels using only the discharge power of the battery 4 without using the power generated by the fuel cell 3.

The fuel cell 3 includes a fuel cell stack 10, a fuel supply source 11, a fuel supply pipe 12, a fuel flow control valve 13, an air supply source 14, an air supply pipe 15, an air flow control valve 16, a water storage tank 17, a drain pipe 18, and a drain valve 19.

The fuel cell stack 10 generates electric power by chemically reacting fuel (here, hydrogen) with oxygen in air. The fuel cell stack 10 has a structure in which a plurality of unit cells is stacked. In the fuel cell stack 10, since hydrogen and oxygen chemically react with each other, water is generated.

The fuel supply source 11 supplies fuel to the fuel cell stack 10. The fuel supply pipe 12 is a pipe that connects the fuel supply source 11 and the fuel cell stack 10 and through which fuel flows from the fuel supply source 11 to the fuel cell stack 10. The fuel flow control valve 13 is an electromagnetic flow control valve that is disposed in the fuel supply pipe 12 and controls a flow rate of fuel supplied to the fuel cell stack 10.

The air supply source 14 supplies air to the fuel cell stack 10. The air supply pipe 15 is a pipe that connects the air supply source 14 and the fuel cell stack 10 and through which air flows from the air supply source 14 to the fuel cell stack 10. The air flow control valve 16 is an electromagnetic flow control valve that is disposed in the air supply pipe 15 and controls a flow rate of air supplied to the fuel cell stack 10.

The water storage tank 17 is connected to an anode of the fuel cell stack 10 through a pipe 20. The water storage tank 17 is a tank that stores water (generated water) generated by the fuel cell stack 10. The drain pipe 18 is a pipe that is connected to the water storage tank 17 and discharges the generated water stored in the water storage tank 17.

The drain valve 19 is an electromagnetic on-off valve that is disposed in the drain pipe 18 and opens and closes a discharge flow path for the generated water. When the drain valve 19 is opened, the generated water stored in the water storage tank 17 flows through the drain pipe 18 and is discharged from a discharge port 18a provided at a distal end of the drain pipe 18.

Note that the generated water may be stored in the fuel cell stack 10 to be in a water storage state. In this case, a part of the generated water permeates the anode of the fuel cell stack 10. The anode stores the generated water in a gas-liquid separator, and discharges the generated water when the stored water amount becomes more than or equal to a certain amount.

As the battery 4, for example, a lithium ion secondary battery or the like is used. When the power generated by the fuel cell 3 is supplied to the battery 4, the battery 4 is charged.

Furthermore, the fuel cell vehicle 2 includes a drive circuit 21, a drive circuit 22, a power distributor 23, an inverter 24, and a traveling motor 25.

The drive circuit 21 includes a switching circuit (not illustrated) that opens and closes the fuel cell stack 10 and the power distributor 23. The drive circuit 22 includes a switching circuit (not illustrated) that opens and closes the battery 4 and the power distributor 23.

The power distributor 23 distributes the generated power of the fuel cell 3 and discharge power of the battery 4. Specifically, the power distributor 23 supplies the generated power of the fuel cell 3 and the discharge power of the battery 4 to the inverter 24. Furthermore, the power distributor 23 supplies the generated power of the fuel cell 3 to the battery 4 to charge the battery 4.

The inverter 24 converts DC power from the fuel cell 3 and the battery 4 into AC power and supplies the AC power to the traveling motor 25.

The traveling motor 25 rotationally drives a drive wheel (not illustrated) of the fuel cell vehicle 2. As the traveling motor 25, for example, a three-phase AC synchronous motor is used.

As also illustrated in FIG. 2, the vehicle control device 5 includes a power switch 30, an EV traveling switch 31, a battery state sensor 32, a vehicle speed sensor 33, an accelerator sensor 34, an entry sensor 35, a car navigation system 36, a drain button 37, and an electronic control unit (ECU) 40.

The power switch 30 is disposed in a driver's seat (not illustrated) of the fuel cell vehicle 2. The power switch 30 used to starts (initiates) the fuel cell vehicle 2. When the power switch 30 is turned ON, stored power of the battery 4 is supplied to each electric system of the fuel cell vehicle 2.

The EV traveling switch 31 is disposed in the driver's seat (not illustrated) of the fuel cell vehicle 2. The EV traveling switch 31 is a manual operation switch (manual operation unit) by which a driver of the fuel cell vehicle 2 performs an instruction operation of the EV traveling mode.

The battery state sensor 32 is a sensor (battery state detection unit) that detects a state of the battery 4. The battery state sensor 32 includes a voltmeter that measures a voltage of the battery 4, a wattmeter that measures output power of the battery 4, a thermometer that measures a temperature of the battery 4, and the like.

The vehicle speed sensor 33 is a sensor (vehicle speed detection unit) that detects a traveling speed (vehicle speed) of the fuel cell vehicle 2. The accelerator sensor 34 is a sensor that detects an opening degree (depression amount) of an accelerator 39 disposed in the driver's seat (not illustrated) of the fuel cell vehicle 2. The accelerator sensor 34 constitutes an accelerator detection unit that detects an operation state of the accelerator 39.

The entry sensor 35 is a sensor that detects that the fuel cell vehicle 2 has entered a predetermined designated area. For example, when the fuel cell vehicle 2 passes through a gate of the designated area and receives a special passage signal (such as an optical signal), the entry sensor 35 outputs a detection signal indicating that the fuel cell vehicle 2 has entered the designated area. The entry sensor 35 constitutes an entry detection unit that detects whether the fuel cell vehicle 2 has entered the predetermined designated area. The designated area will be described in detail later.

The car navigation system 36 is disposed in the driver's seat (not illustrated) of the fuel cell vehicle 2. The car navigation system 36 is a device that displays the current position of the fuel cell vehicle 2 and guides a route of the fuel cell vehicle 2 to the destination.

The drain button 37 is disposed in the driver's seat (not shown) of the fuel cell vehicle 2. The drain button 37 is a manual operation button for the driver to perform an instruction operation of drain water from the fuel cell 3.

The ECU 40 includes, for example, a CPU, a ROM, a RAM, an input/output interface, and the like. The ECU 40 incorporates a timer 41. The timer 41 constitutes a traveling time detection unit that detects a traveling time of the fuel cell vehicle 2.

As illustrated in FIG. 2, the ECU 40 includes a normal traveling control unit 42, an EV traveling control unit 43, an EV traveling mode switching determination unit 44, a battery charging rate estimation unit 45, a battery outputtable threshold acquisition unit 46, an EV traveling mode permission determination unit 47, a traveling request power estimation unit 48, an EV traveling mode cancellation determination unit 49, and a drainage control unit 50.

The normal traveling control unit 42 controls the fuel flow control valve 13, the air flow control valve 16, the drive circuits 21 and 22, and the power distributor 23 so that the fuel cell vehicle 2 travels in the normal traveling mode.

Specifically, the normal traveling control unit 42 controls the opening degrees of the fuel flow control valve 13 and the air flow control valve 16 to generate power by the fuel cell 3, and controls the drive circuits 21 and 22 and the power distributor 23 so that the generated power of the fuel cell 3 and the discharge power of the battery 4 are supplied to the inverter 24. Furthermore, the normal traveling control unit 42 controls the drive circuits 21 and 22 and the power distributor 23 such that the generated power of the fuel cell 3 is supplied to the battery 4 as necessary.

The EV traveling control unit 43 controls the fuel flow control valve 13, the air flow control valve 16, the drive circuits 21 and 22, and the power distributor 23 so that the fuel cell vehicle 2 travels in the EV traveling mode.

Specifically, the EV traveling control unit 43 controls the fuel flow control valve 13 and the air flow control valve 16 to be in a fully closed state to stop the power generation of the fuel cell 3 and controls the drive circuits 21 and 22 and the power distributor 23 so that the discharge power of the battery 4 is supplied to the inverter 24.

The EV traveling mode switching determination unit 44 determines whether the traveling mode of the fuel cell vehicle 2 has been switched from the normal traveling mode to the EV traveling mode based on an operation signal of the EV traveling switch 31 and a detection signal of the entry sensor 35. The EV traveling mode switching determination unit 44 constitutes a switching determination unit that determines whether the traveling mode of the fuel cell vehicle 2 has been switched from the normal traveling mode to the EV traveling mode.

Figure 3:
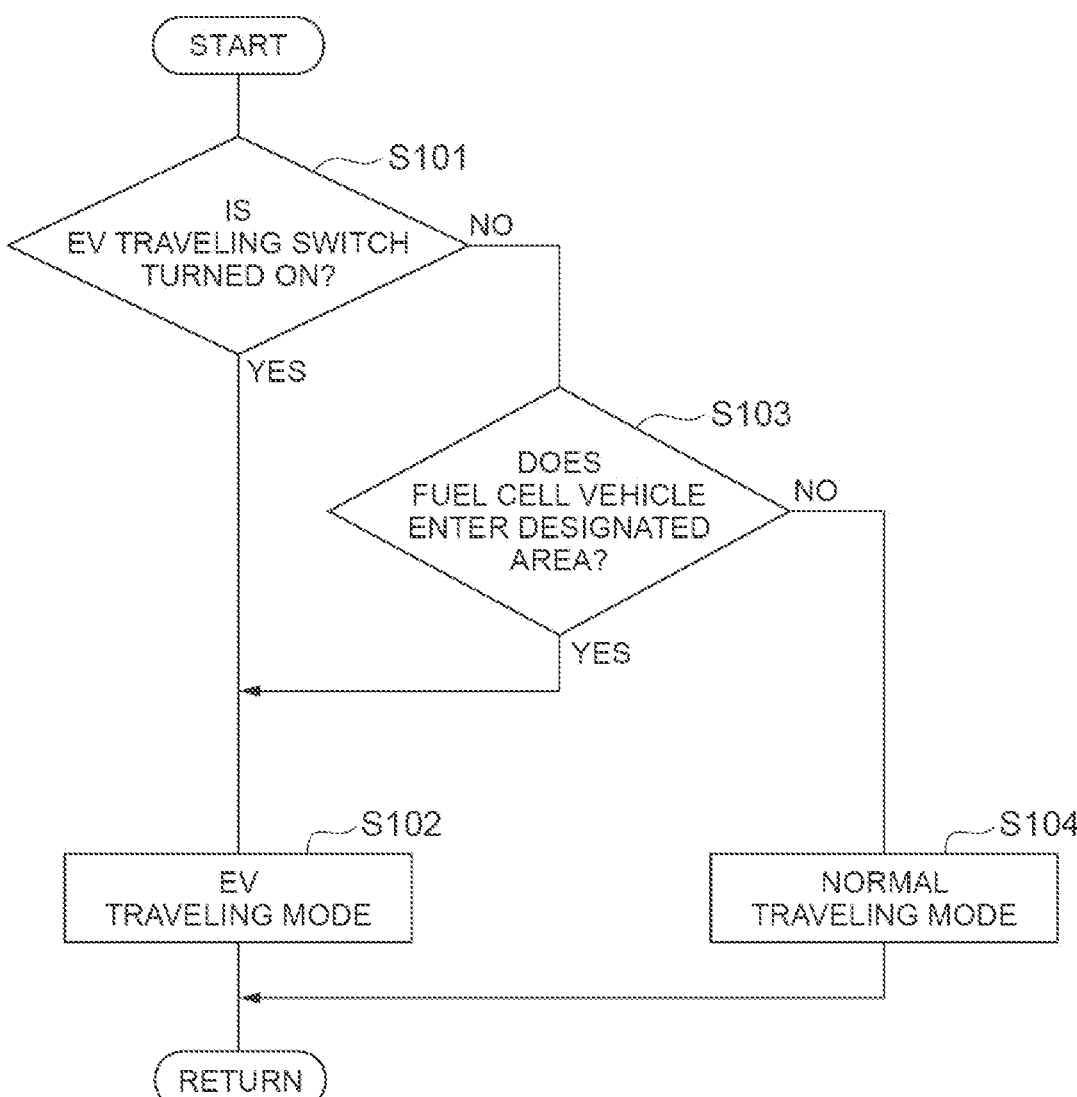
FIG. 3 is a flowchart showing a procedure of a switching determination process executed by an EV traveling mode switching determination unit illustrated in FIG. 2.

FIG. 3 is a flowchart showing a procedure of a switching determination process executed by the EV traveling mode switching determination unit 44. This process is executed when the power switch 30 is turned ON. Note that, at the start of this process, the traveling mode of the fuel cell vehicle 2 is the normal traveling mode.

In FIG. 3, the EV traveling mode switching determination unit 44 first determines whether the EV traveling switch 31 is turned ON based on the operation signal of the EV traveling switch 31 (step S101). When determining that the EV traveling switch 31 is turned ON, the EV traveling mode switching determination unit 44 determines that the traveling mode of the fuel cell vehicle 2 has been switched from the normal traveling mode to the EV traveling mode (step S102).

When determining that the EV traveling switch 31 is not turned ON, the EV traveling mode switching determination unit 44 determines whether the fuel cell vehicle 2 has entered the designated area based on the detection signal of the entry sensor 35 (step S103). The designated area is an area where the fuel cell vehicle 2 needs to travel in the EV traveling mode because drainage from the fuel cell 3 is prohibited. The designated area is, for example, inside a large site such as inside a factory site.

When determining that the fuel cell vehicle 2 has entered the designated area, the EV traveling mode switching determination unit 44 determines that the traveling mode of the fuel cell vehicle 2 has been switched from the normal traveling mode to the EV traveling mode (step S102). When determining that the fuel cell vehicle 2 has not entered the designated area, the EV traveling mode switching determination unit 44 determines that the traveling mode of the fuel cell vehicle 2 remains the normal traveling mode (step S104).

The EV traveling mode switching determination unit 44 executes step S102 or step S104 and then executes step S101 again.

Returning to FIG. 2, the battery charging rate estimation unit 45 estimates a state of charge (SOC) of the battery 4 on the basis of a state of the battery 4 detected by the battery state sensor 32. The battery charging rate estimation unit 45 constitutes a charging rate detection unit that detects a charging rate of the battery 4 in cooperation with the battery state sensor 32.

For example, the battery charging rate estimation unit 45 calculates an open voltage of the battery 4 from a measurement value of the voltmeter, and obtains a charging rate of the battery 4 from the open voltage of the battery 4. Note that the battery 4 has a characteristic that the charging rate increases as the open voltage increases.

Based on the state of the battery 4 detected by the battery state sensor 32, the battery outputtable threshold acquisition unit 46 obtains a threshold (outputtable threshold) at which the battery 4 becomes ready for output. The outputtable threshold is obtained from, for example, a temperature of the battery 4.

When the EV traveling mode switching determination unit 44 determines that the traveling mode of the fuel cell vehicle 2 has been switched from the normal traveling mode to the EV traveling mode, the EV traveling mode permission determination unit 47 determines whether to permit traveling in the EV traveling mode based on the charging rate of the battery 4 estimated by the battery charging rate estimation unit 45, the outputtable threshold acquired by the battery outputtable threshold acquisition unit 46, and the detection signals of the battery state sensor 32 and the vehicle speed sensor 33.

When the charging rate of the battery 4 estimated by the battery charging rate estimation unit 45 is greater than or equal to a charging rate threshold for permission, the EV traveling mode permission determination unit 47 permits traveling in the EV traveling mode.

In cooperation with the battery outputtable threshold acquisition unit 46, the EV traveling mode permission determination unit 47 constitutes a permission determination unit that determines whether to permit traveling in the EV traveling mode based on the charging rate of the battery 4 when it is determined that the traveling mode of the fuel cell vehicle 2 has been switched from the normal traveling mode to the EV traveling mode.

Figure 4:
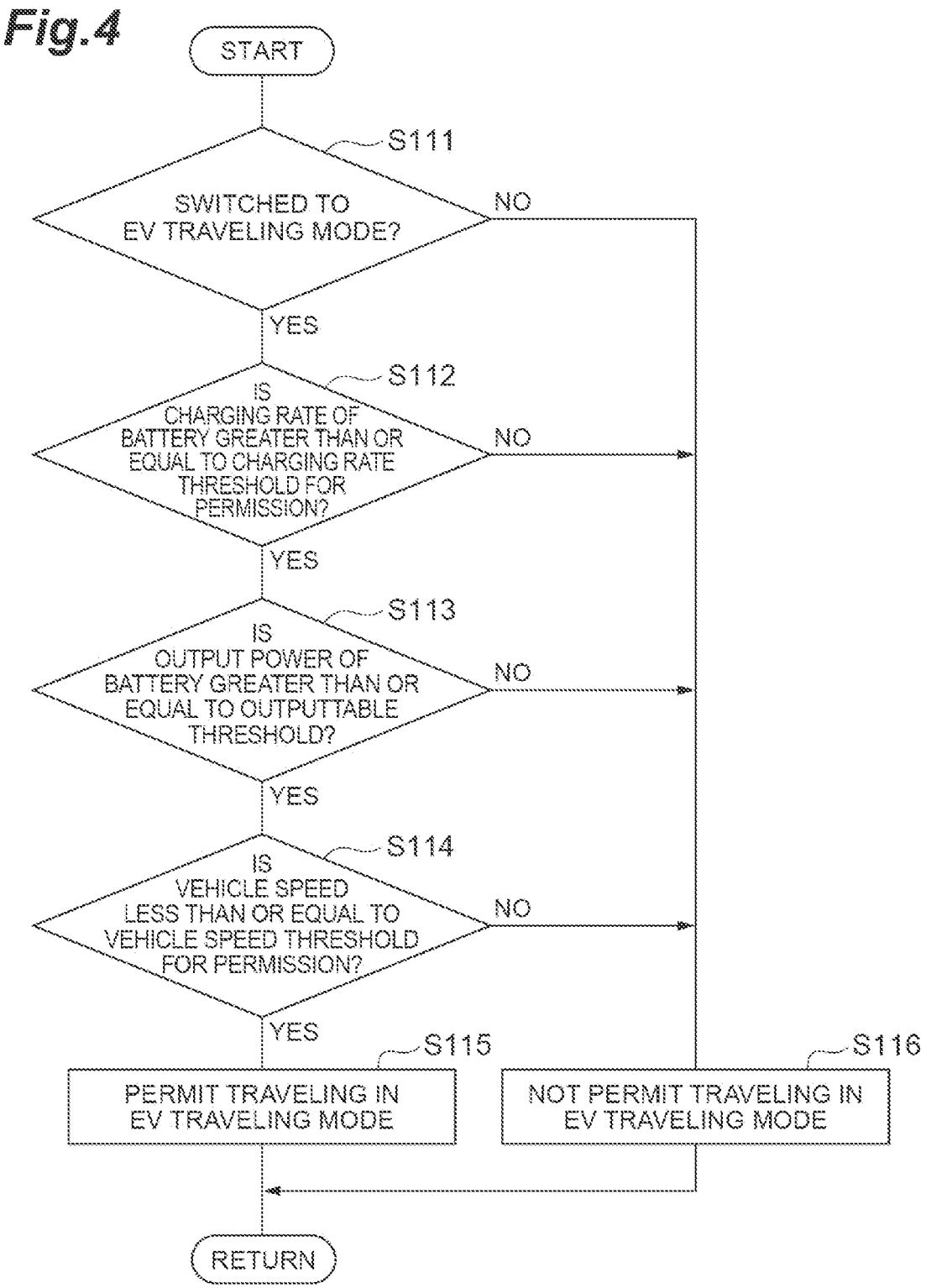
FIG. 4 is a flowchart showing a procedure of a permission determination process executed by the EV traveling mode permission determination unit illustrated in FIG. 2.

FIG. 4 is a flowchart showing a procedure of a permission determination process executed by the EV traveling mode permission determination unit 47. This process is also executed when the power switch 30 is tuned ON.

In FIG. 4, the EV traveling mode permission determination unit 47 first determines whether the traveling mode of the fuel cell vehicle 2 has been switched from the normal traveling mode to the EV traveling mode based on a determination result of the EV traveling mode switching determination unit 44 (step S111).

When determining that the traveling mode of the fuel cell vehicle 2 has been switched from the normal traveling mode to the EV traveling mode, the EV traveling mode permission determination unit 47 determines whether the charging rate of the battery 4 estimated by the battery charging rate estimation unit 45 is greater than or equal to a predetermined charging rate threshold (A %) for permission (step S112). The charging rate threshold for permission is set so that the fuel cell vehicle 2 can travel in ax wide site for a predetermined time only in the EV traveling mode with a margin. The charging rate threshold for permission is, for example, an upper limit value of the charging rate of the battery 4. The upper limit value of the charging rate of the battery 4 is a value close to full charge of the battery 4 (for example, 85% to 95%).

When determining that the charging rate of the battery 4 is greater than or equal to the charging rate threshold for permission, the EV traveling mode permission determination unit 47 determines whether the output power of the battery 4 detected by the battery state sensor 32 is greater than or equal to the outputtable threshold (BkW) obtained by the battery outputtable threshold acquisition unit 46 (step S113).

When determining that the output power of the battery 4 is greater than or equal to the outputtable threshold, the EV traveling mode permission determination unit 47 determines whether the vehicle speed of the fuel cell vehicle 2 detected by the vehicle speed sensor 33 is less than or equal to a vehicle speed threshold (Ckm/h) for permission (step S114). The vehicle speed threshold for permission may be, for example, a low speed value or zero.

When determining that the vehicle speed of the fuel cell vehicle 2 is less than or equal to the vehicle speed threshold for permission, the EV traveling mode permission determination unit 47 permits traveling in the EV traveling mode (step S115). When the traveling in the EV traveling mode is permitted, the EV traveling control unit 43 controls the fuel cell vehicle 2 to travel in the EV traveling mode.

The EV traveling mode permission determination unit 47 does not permit traveling in the EV traveling mode when determining that the traveling mode of the fuel cell vehicle 2 is not switched from the normal traveling mode to the EV traveling mode in step S111, when determining that the charging rate of the battery 4 is not greater than or equal to the charging rate threshold for permission in step S112, when determining that the output power of the battery 4 is not greater than or equal to the outputtable threshold in step S113, or when determining that the vehicle speed of the fuel cell vehicle 2 is not less than or equal to the vehicle speed threshold for permission in step S114 (step S116). When the traveling in the EV traveling mode is not permitted, the normal traveling control unit 42 controls the fuel cell vehicle 2 to travel in the normal traveling mode.

The EV traveling mode permission determination unit 47 executes step S115 or step S116 and then executes step S111 again.

Returning to FIG. 2, the traveling request power estimation unit 48 estimates traveling request power of the fuel cell vehicle 2 based on the opening degree of the accelerator 39 detected by the accelerator sensor 34. The larger the opening degree of the accelerator 39, the higher the traveling request power.

In a state in which the traveling mode of the fuel cell vehicle 2 is the EV traveling mode, the EV traveling mode cancellation determination unit 49 determines whether to cancel the traveling in the EV traveling mode based on the operation signal of the EV traveling switch 31, the detection signal of the vehicle speed sensor 33, the measurement signal of the timer 41, the charging rate of the battery 4 estimated by the battery charging rate estimation unit 45, and the traveling request power estimated by the traveling request power estimation unit 48.

The EV traveling mode cancellation determination unit 49 constitutes a cancellation determination unit that determines whether to cancel the traveling in the EV traveling mode in cooperation with the traveling request power estimation unit 48.

FIG. 5 is a flowchart showing a procedure of a cancellation determination process executed by the EV traveling mode cancellation determination unit 49. This process is executed in a state where the traveling mode of the fuel cell vehicle 2 is the EV traveling mode after the power switch 30 is turned ON.

In FIG. 5, the EV traveling mode cancellation determination unit 49 first determines whether the EV traveling switch 31 has been turned OFF from the ON state based on the operation signal of the EV traveling switch 31 (step S121). When determining that the EV traveling switch 31 has been turned OFF from the ON state, the EV traveling mode cancellation determination unit 49 determines that the cancellation of the EV traveling mode has been instructed, and cancels the traveling in the EV traveling mode (step S122).

When determining that the EV traveling switch 31 is not turned OFF from the ON state, the EV traveling mode cancellation determination unit 49 determines whether the charging rate of the battery 4 estimated by the battery charging rate estimation unit 45 is less than or equal to a predetermined charging rate threshold (D %) for cancellation (step S123). The charging rate threshold for cancellation is a value lower than the above-described charging rate threshold for permission. When determining that the charging rate of the battery 4 is less than or equal to the charging rate threshold for cancellation, the EV traveling mode cancellation determination unit 49 determines that the cancellation of the EV traveling mode has been instructed, and cancels the traveling in the EV traveling mode (step S122).

When determining that the charging rate of the battery 4 is not less than or equal to the charging rate threshold for cancellation, the EV traveling mode cancellation determination unit 49 determines whether the vehicle speed of the fuel cell vehicle 2 is greater than or equal to a predetermined vehicle speed threshold (Ekm/h) for cancellation based on the detection signal of the vehicle speed sensor 33 (step S124). The vehicle speed threshold for cancellation is a value higher than the vehicle speed threshold for permission. When determining that the vehicle speed of the fuel cell vehicle 2 is greater than or equal to the vehicle speed threshold for cancellation, the EV traveling mode cancellation determination unit 49 determines that the cancellation of the EV traveling mode has been instructed, and cancels the traveling in the EV traveling mode (step S122).

When determining that the vehicle speed of the fuel cell vehicle 2 is not greater than or equal to the vehicle speed threshold for cancellation, the EV traveling mode cancellation determination unit 49 determines whether the traveling time in the EV traveling mode measured by the timer 41 is greater than or equal to a predetermined traveling time threshold (F minutes) (step S125). The traveling time threshold is, for example, a time during which the charging rate of the battery 4 decreases from a state of being greater than or equal to the upper limit value to the charging rate threshold for cancellation when the fuel cell vehicle 2 travels at a predetermined vehicle speed. When determining that the traveling time in the EV traveling mode is greater than or equal to the traveling time threshold, the EV traveling mode cancellation determination unit 49 determines that the cancellation of the EV traveling mode has been instructed, and cancels the traveling in the EV traveling mode (step S122).

When determining that the traveling time in the EV traveling mode is not greater than or equal to the traveling time threshold, the EV traveling mode cancellation determination unit 49 determines whether the traveling request power of the fuel cell vehicle 2 estimated by the traveling request power estimation unit 48 is greater than or equal to a power threshold (GkW) (step S126). The power threshold is, for example, a value at which the fuel cell vehicle 2 can climb a steep slope. When determining that the traveling request power of the fuel cell vehicle 2 is greater than or equal to the power threshold, the EV traveling mode cancellation determination unit 49 determines that the cancellation of the EV traveling mode has been instructed, and cancels the traveling in the EV traveling mode (step S122).

When the traveling in the EV traveling mode is canceled in step S122, the normal traveling control unit 42 controls the fuel cell vehicle 2 to travel in the normal traveling mode.

When determining that the traveling request power of the fuel cell vehicle 2 is not greater than or equal to the power threshold, the EV traveling mode cancellation determination unit 49 does not execute step S122. Therefore, the EV traveling control unit 43 controls the fuel cell vehicle 2 to continuously travel in the EV traveling mode.

Returning to FIG. 2, the drainage control unit 50 performs control to open the drain valve 19 when the drain button 37 is turned ON. Then, since the drain valve 19 is opened, the generated water stored in the fuel cell 3 is drained.

As described above, the travel control device 1 of the present embodiment includes the EV traveling switch 31, the battery state sensor 32, the vehicle speed sensor 33, the accelerator sensor 34, the entry sensor 35, the car navigation system 36, the timer 41 of the ECU 40, the normal traveling control unit 42, the EV traveling control unit 43, the EV traveling mode switching determination unit 44, the battery charging rate estimation unit 45, the battery outputtable threshold acquisition unit 46, the EV traveling mode permission determination unit 47, the traveling request power estimation unit 48, and the EV traveling mode cancellation determination unit 49.

By the way, since the weight of a vehicle itself is heavy, a large commercial vehicle needs to travel using the discharge power of the battery and the generated power of the fuel cell. Furthermore, the large commercial vehicle needs to charge the battery with power generated by the fuel cell. For this reason, when the fuel cell vehicle 2 is a large commercial vehicle, water (generated water) generated by the power generation of the fuel cell 3 is stored in the fuel cell 3 by continuously performing the power generation of the fuel cell 3. Then, when the generated water in the fuel cell 3 is fill, the driver turns ON the drain button 37 to drain water from the fuel cell 3.

However, the fuel cell vehicle 2 may travel in a factory site where drainage is not allowed in a wide range. When the fuel cell vehicle 2 travels in such a factory site and generated water stored in the fuel cell 3 by power generation of the fuel cell 3 increases, it is necessary to discharge water from the fuel cell 3 as described above. In this case, an inconvenience occurs in that, for example, the fuel cell vehicle 2 once leaves the factory site, drains water from the fuel cell 3 outside the factory site and then returns to the factory site again.

In view of such a problem, in the present embodiment, it is determined whether the traveling mode of the fuel cell vehicle 2 has been switched from the normal traveling mode to the EV traveling mode. The normal traveling mode is a traveling mode in which the vehicle travels mainly using the power generated by the fuel cell 3. The EV traveling mode is a traveling mode in which the power generation of the fuel cell 3 is stopped and the vehicle travels using the discharge power of the battery 4. Then, when it is determined that the traveling mode of the fuel cell vehicle 2 has been switched to the EV traveling mode, it is determined whether to permit the traveling in the EV traveling mode based on the charging rate of the battery 4. Specifically, when the charging rate of the battery 4 is greater than or equal to the charging rate threshold for permission, the traveling in the EV traveling mode is permitted. Then, the fuel cell vehicle 2 stops the power generation of the fuel cell 3, and travels using only the discharge power of battery 4. At this time, since the charging rate of the battery 4 is greater than or equal to the charging rate threshold for permission, the stored power of the battery 4 is suppressed from becoming insufficient. By stopping the power generation of the fuel cell 3 in this way, water generated by the power generation of the fuel cell 3 is prevented from being stored in the fuel cell 3, so that it is not necessary to discharge water from the fuel cell 3. This makes it possible to suppress drainage from the fuel cell 3 when the fuel cell vehicle 2 travels in a place where drainage is not allowed.

Furthermore, in the present embodiment, when it is determined that the traveling mode of the fuel cell vehicle 2 has been switched to the EV traveling mode, the traveling in the EV traveling mode is permitted when it is determined that the charging rate of the battery 4 is greater than or equal to the charging rate threshold for permission and the output power of the battery 4 is greater than or equal to the outputtable threshold. Therefore, even when the state of the battery 4 fluctuates due to environmental changes or the like, it is possible to appropriately suppress drainage from the fuel cell 3 when the fuel cell vehicle 2 travels in a place where drainage is not allowed.

Furthermore, in the present embodiment, when it is determined that the traveling mode of the fuel cell vehicle 2 has been switched to the EV traveling mode, the traveling in the EV traveling mode is permitted when the charging rate of the battery 4 is greater than or equal to the charging rate threshold for permission and the vehicle speed of the fuel cell vehicle 2 is less than or equal to the vehicle speed threshold for permission. Therefore, when the fuel cell vehicle 2 is traveling at a low speed (including a vehicle speed of zero), the traveling in the EV traveling mode is permitted, so that power consumption of the battery 4 can be suppressed.

Furthermore, in the present embodiment, it is determined whether to cancel the traveling in the EV traveling mode in a state where the traveling mode of the fuel cell vehicle 2 is the EV traveling mode. When the traveling in the EV traveling mode is canceled, the fuel cell vehicle 2 travels in the normal traveling mode. Therefore, the power consumption of the battery 4 can be suppressed.

Furthermore, in the present embodiment, when the EV traveling switch 31 is turned OFF, the traveling in the EV traveling mode is canceled. Therefore, when the driver of the fuel cell vehicle 2 performs an OFF operation of the EV traveling switch 31, the traveling in the EV traveling mode is canceled by the will of the driver.

Furthermore, in the present embodiment, when the charging rate of the battery 4 is less than or equal to the charging rate threshold for cancellation, the traveling in the EV traveling mode is canceled. Therefore, when the charging rate of the battery 4 decreases to the charging rate threshold for cancellation, the traveling in the EV traveling mode is automatically canceled. Therefore, excessive use of the energy of the battery 4 is suppressed.

Furthermore, in the present embodiment, the traveling in the EV traveling mode is also canceled when the vehicle speed of the fuel cell vehicle 2 is greater than or equal to the vehicle speed threshold for cancellation. Therefore, when the vehicle speed of the fuel cell vehicle 2 increases to the vehicle speed threshold for cancellation, the traveling in the EV traveling mode is automatically canceled. Therefore, excessive use of the energy of the battery 4 is further suppressed.

Furthermore, in the present embodiment, the traveling in the EV traveling mode is also canceled when the traveling time of the fuel cell vehicle 2 is greater than or equal to the traveling time threshold. Therefore, when the traveling time of the fuel cell vehicle 2 reaches the traveling time threshold, the traveling in the EV traveling mode is automatically canceled. Therefore, excessive use of the energy of the battery 4 is further suppressed.

Since the excessive use of the energy of the battery 4 is suppressed in this manner, it is possible to suppress hindrance to traveling after traveling in a place where drainage is not allowed is finished. For example, when the fuel cell vehicle 2 travels on a general road after coming out of the factory site, it is possible to prevent the stored power of the battery 4 from becoming insufficient.

Furthermore, in the present embodiment, the traveling in the EV traveling mode is canceled also when it is determined that the traveling request power of the fuel cell vehicle 2 is greater than or equal to the power threshold. Therefore, when the traveling request power of the fuel cell vehicle 2 becomes greater than or equal to the power threshold, the traveling in the EV traveling mode is automatically canceled. Therefore, for example, when a large amount of traveling power is required as in traveling on an upslope or the like, the fuel cell vehicle 2 travels in the normal traveling mode, and thus smooth traveling can be performed.

Furthermore, in the present embodiment, when the EV traveling switch 31 is turned ON, it is determined that the traveling mode of the fuel cell vehicle 2 has been switched from the normal traveling mode to the EV traveling mode. Therefore, when the driver of the fuel cell vehicle 2 performs an ON operation of the EV traveling switch 31, the traveling mode of the fuel cell vehicle 2 is switched to the EV traveling mode by the will of the driver.

Furthermore, in the present embodiment, when it is detected that the fuel cell vehicle 2 has entered the designated area, it is determined that the traveling mode of the fuel cell vehicle 2 has been switched from the normal traveling mode to the EV traveling mode. Therefore, when the fuel cell vehicle 2 enters the designated area, the traveling mode of the fuel cell vehicle 2 is automatically switched to the EV traveling mode.

Note that the present disclosure is not limited to the above embodiments. For example, in the above embodiment, when it is determined that the traveling mode of the fuel cell vehicle 2 has been switched from the normal traveling mode to the EV traveling mode, the traveling in the EV traveling mode is permitted when the charging rate of the battery 4 is greater than or equal to the charging rate threshold for permission, the output power of the battery 4 is greater than or equal to the outputtable threshold, and the vehicle speed of the fuel cell vehicle 2 is less than or equal to the vehicle speed threshold for permission. However, the present disclosure is not particularly limited to such an embodiment. When it is determined that the traveling mode of the fuel cell vehicle 2 has been switched from the normal traveling mode to the EV traveling mode, the traveling in the EV traveling mode may be permitted at least when the charging rate of the battery 4 is greater than or equal to the charging rate threshold for permission.

For example, when it is determined that the traveling mode of the fuel cell vehicle 2 has been switched from the normal traveling mode to the EV traveling mode, the traveling in the EV traveling mode may be permitted when the charging rate of the battery 4 is greater than or equal to the charging rate threshold for permission and the output power of the battery 4 is greater than or equal to the outputtable threshold. Furthermore, when it is determined that the traveling mode of the fuel cell vehicle 2 has been switched from the normal traveling mode to the EV traveling mode, the traveling in the EV traveling mode may be permitted when the charging rate of the battery 4 is greater than or equal to the charging rate threshold for permission and the vehicle speed of the fuel cell vehicle 2 is less than or equal to the vehicle speed threshold for permission.

Furthermore, in the above embodiment, the fuel flow control valve 13 and the air flow control valve 16 are fully closed to stop the supply of the fuel and the air to the fuel cell stack 10, so that the power generation of the fuel cell 3 is stopped. However, the present disclosure is not particularly limited to this mode. For example, a power supply (not illustrated) of the fuel cell 3 may be turned off to stop the operation of the fuel cell 3, so that the power generation of the fuel cell 3 is stopped.

Furthermore, in the above embodiment, whether the traveling mode of the fuel cell vehicle 2 is switched from the normal traveling mode to the EV traveling mode is determined based on the detection signal of the entry sensor 35 that detects the entry of the fuel cell vehicle 2 into the designated area. However, the present disclosure is not particularly limited to such a mode. For example, the driver of the fuel cell vehicle 2 may register the designated area in the car navigation system 36 in advance, and determine whether the traveling mode of the fuel cell vehicle 2 has been switched from the normal traveling mode to the EV traveling mode based on the information of the car navigation system 36. In this case, the car navigation system 36 constitutes an entry detection unit that detects whether the fuel cell vehicle 2 has entered a predetermined designated area.

Furthermore, in the above embodiment, the factory site having a wide range where drainage is not allowed is determined in advance as the designated area, but the designated area is not particularly limited to the factory site, and may be, for example, a place such as a home parking lot or a multi-story parking lot where drainage is not desired.

Furthermore, in the above embodiment, hydrogen is used as the fuel, but the fuel to be used is not particularly limited to hydrogen, and may be natural gas, methanol, or the like. In this case, a reformer that reforms the fuel to generate hydrogen is required.

Furthermore, in the above embodiment, the fuel cell vehicle 2 is a large commercial vehicle, but the fuel cell vehicle 2 is not particularly limited to a large commercial vehicle, and may be a small commercial vehicle, a passenger car, or the like.

In this case, when the fuel cell vehicle 2 travels in the normal traveling mode, a driving mode of the fuel cell vehicle 2 may be changed according to the load of the fuel cell vehicle 2. For example, the fuel cell vehicle 2 may be driven by using only the discharge power of the battery 4 while stopping the power generation of the fuel cell 3 at the time of the light load, and the fuel cell vehicle 2 may be driven by using the generated power of the fuel cell 3 and the discharge power of the battery 4 at the time of the high load.

REFERENCE SIGNS LIST 1 travel control device
2 fuel cell vehicle
3 fuel cell 4 battery 31 EV traveling switch (manual operation unit)

32 battery state sensor (battery state detection unit, charging rate detection unit)

33 vehicle speed sensor (vehicle speed detection unit)

34 accelerator sensor (accelerator detection unit)

35 entry sensor (entry detection unit)

36 car navigation system (entry detection unit)

39 accelerator 41 timer (traveling time detection unit)

44 EV traveling mode switching determination unit (switching determination unit)

45 battery charging rate estimation unit (charging rate detection unit)

46 battery outputtable threshold acquisition unit (permission determination unit)

47 EV traveling mode permission determination unit (permission determination unit)

48 traveling request power estimation unit (cancellation determination unit)

49 EV traveling mode cancellation determination unit (cancellation determination unit).

What is claimed is:

1. A travel control device for a fuel cell vehicle including a fuel cell and a battery, the travel control device comprising:

a switching determination unit configured to determine whether a traveling mode of the fuel cell vehicle is switched from a first traveling mode in which the fuel cell vehicle travels mainly using power generated by the fuel cell to a second traveling mode in which the power generation of the fuel cell is stopped and the fuel cell vehicle travels using discharge power of the battery;

a charging rate detection unit configured to detect a charging rate of the battery; and a permission determination unit configured to determine whether to permit traveling in the second traveling mode based on the charging rate of the battery detected by the charging rate detection unit when the switching determination unit determines that the traveling mode of the fuel cell vehicle has been switched from the first traveling mode to the second traveling mode, wherein the permission determination unit is configured to permit traveling in the second traveling mode when the charging rate of the battery is greater than or equal to a predetermined charging rate threshold for permission.

2. The travel control device for a fuel cell vehicle according to claim 1, further comprising a battery state detection unit configured to detect a state of the battery, wherein the permission determination unit is configured to permit traveling in the second traveling mode when it is determined that the charging rate of the battery is greater than or equal to the charging rate threshold for permission and output power of the battery is greater than or equal to an outputtable threshold based on the state of the battery detected by the battery state detection unit.

3. The travel control device for a fuel cell vehicle according to claim 1, further comprising a vehicle speed detection unit configured to detect a vehicle speed of the fuel cell vehicle, wherein the permission determination unit is configured to permit traveling in the second traveling mode when the charging rate of the battery is greater than or equal to the charging rate threshold for permission and the vehicle speed of the fuel cell vehicle detected by the vehicle speed detection unit is less than or equal to a predetermined vehicle speed threshold for permission.

4. The travel control device for a fuel cell vehicle according to claim 1, further comprising a cancellation determination unit configured to determine whether to cancel traveling in the second traveling mode in a state where the traveling mode of the fuel cell vehicle is the second traveling mode.

5. The travel control device for a fuel cell vehicle according to claim 4, further comprising a manual operation unit configured to perform an instruction operation of the second traveling mode, wherein the cancellation determination unit is configured to cancel traveling in the second traveling mode when the manual operation unit is turned OFF.

6. The travel control device for a fuel cell vehicle according to claim 4, wherein the cancellation determination unit is configured to cancel traveling in the second traveling mode when the charging rate of the battery is less than or equal to a predetermined charging rate threshold for cancellation.

7. The travel control device for a fuel cell vehicle according to claim 4, further comprising a vehicle speed detection unit configured to detect a vehicle speed of the fuel cell vehicle, wherein the cancellation determination unit is configured to cancel traveling in the second traveling mode when the vehicle speed of the fuel cell vehicle detected by the vehicle speed detection unit is greater than or equal to a predetermined vehicle speed threshold for cancellation.

8. The travel control device for a fuel cell vehicle according to claim 4, further comprising a traveling time detection unit configured to detect a traveling time of the fuel cell vehicle, wherein the cancellation determination unit is configured to cancel traveling in the second traveling mode when the traveling time of the fuel cell vehicle detected by the traveling time detection unit is greater than or equal to a predetermined traveling time threshold.

9. The travel control device for a fuel cell vehicle according to claim 4, further comprising an accelerator detection unit configured to detect an operation state of an accelerator of the fuel cell vehicle, wherein the cancellation determination unit is configured to cancel traveling in the second traveling mode when it is determined that traveling request power of the fuel cell vehicle is greater than or equal to a predetermined power threshold based on the operation state of the accelerator detected by the accelerator detection unit.

10. The travel control device for a fuel cell vehicle according to claim 1, further comprising a manual operation unit configured to perform an instruction operation of the second traveling mode, wherein the switching determination unit is configured to determine that the traveling mode of the fuel cell vehicle has been switched from the first traveling mode to the second traveling mode when the manual operation unit is turned ON.

11. The travel control device for a fuel cell vehicle according to claim 1, further comprising an entry detection unit configured to detect whether the fuel cell vehicle has entered a predetermined designated area, wherein the switching determination unit is configured to determine that the traveling mode of the fuel cell vehicle has been switched from the first traveling mode to the second traveling mode when the entry detection unit detects that the fuel cell vehicle has entered the designated area.

12. The travel control device for a fuel cell vehicle according to claim 1, wherein the predetermined designated area is an area where drainage is prohibited or an area where drainage is not desired.

\* \* \* \* \*